United States Patent
Moon

(10) Patent No.: US 7,690,804 B2
(45) Date of Patent: Apr. 6, 2010

(54) BACKLIGHT UNIT OF LIQUID CRYSTAL DISPLAY

(75) Inventor: Jeong Min Moon, Goonpo-si (KR)

(73) Assignee: LG. Display Co., Ltd., Seoul (KR)

( * ) Notice: Subject to any disclaimer, the term of this patent is extended or adjusted under 35 U.S.C. 154(b) by 0 days.

(21) Appl. No.: 11/159,543

(22) Filed: Jun. 23, 2005

(65) Prior Publication Data

US 2006/0002145 A1    Jan. 5, 2006

(30) Foreign Application Priority Data

Jun. 30, 2004    (KR) .................. 10-2004-0050546

(51) Int. Cl.
 G09F 13/04        (2006.01)
 F21V 7/04         (2006.01)
 G02F 1/1335       (2006.01)

(52) U.S. Cl. .................. 362/97.2; 362/225; 362/634; 349/70

(58) Field of Classification Search ............. 362/249, 362/223, 255, 558, 260, 311, 356, 355, 31, 362/26, 97.1, 97.2, 634, 217.14, 225; 313/116; 349/58, 70
See application file for complete search history.

(56) References Cited

U.S. PATENT DOCUMENTS

| | | | | |
|---|---|---|---|---|
| 3,115,309 A * | 12/1963 | Spencer et. al. | ............. | 362/217 |
| 4,061,946 A * | 12/1977 | Schreurs | .................. | 313/488 |
| 4,797,594 A * | 1/1989 | Sigai et al. | .................. | 313/488 |
| 4,991,070 A * | 2/1991 | Stob | ........................... | 362/223 |
| 5,645,337 A * | 7/1997 | Gleckman | .................... | 362/29 |
| 5,723,937 A * | 3/1998 | Whitman et al. | ............ | 313/116 |
| 5,739,879 A * | 4/1998 | Tsai | ............................ | 349/62 |
| 6,402,343 B1 * | 6/2002 | Vollkommer et al. | ....... | 362/256 |
| 6,722,773 B2 * | 4/2004 | Tsai et al. | .................... | 362/216 |
| 6,796,685 B1 * | 9/2004 | Nemirow | ..................... | 362/293 |
| 6,830,354 B2 * | 12/2004 | Ono | .............................. | 362/614 |
| 6,890,087 B2 * | 5/2005 | Ono | .............................. | 362/260 |
| 6,964,496 B2 * | 11/2005 | Yang et al. | .................... | 362/220 |
| 2004/0008512 A1 * | 1/2004 | Kim | .............................. | 362/235 |
| 2004/0037073 A1 * | 2/2004 | Yang et al. | .................... | 362/218 |
| 2004/0257493 A1 * | 12/2004 | Lim | .............................. | 349/64 |
| 2005/0141217 A1 * | 6/2005 | Kim | .............................. | 362/225 |
| 2005/0248939 A1 * | 11/2005 | Li et al. | ....................... | 362/225 |
| 2006/0017366 A1 * | 1/2006 | Hendriks et al. | ............ | 313/489 |

FOREIGN PATENT DOCUMENTS

JP        01167883 A  *  7/1989

* cited by examiner

*Primary Examiner*—Jong-Suk (James) Lee
*Assistant Examiner*—David R Crowe
(74) *Attorney, Agent, or Firm*—Brinks Hofer Gilson & Lione

(57) ABSTRACT

A backlight unit is presented that contains lamp support structures uniquely fitted to facilitate installation of lamps in a particular orientation. The backlight unit has tube light-emitting lamps, each of which is fitted to an asymmetric lamp holder. Lamp supports fixedly engage the asymmetric lamp holders fitted to the tube type light-emitting lamps. At least one of the lamp holders has an asymmetric hole. An outer case includes the supports to fix and support each lamp. At least one lamp has a treated surface that includes an optical sheet having a light transmittance lower than 100%.

6 Claims, 9 Drawing Sheets

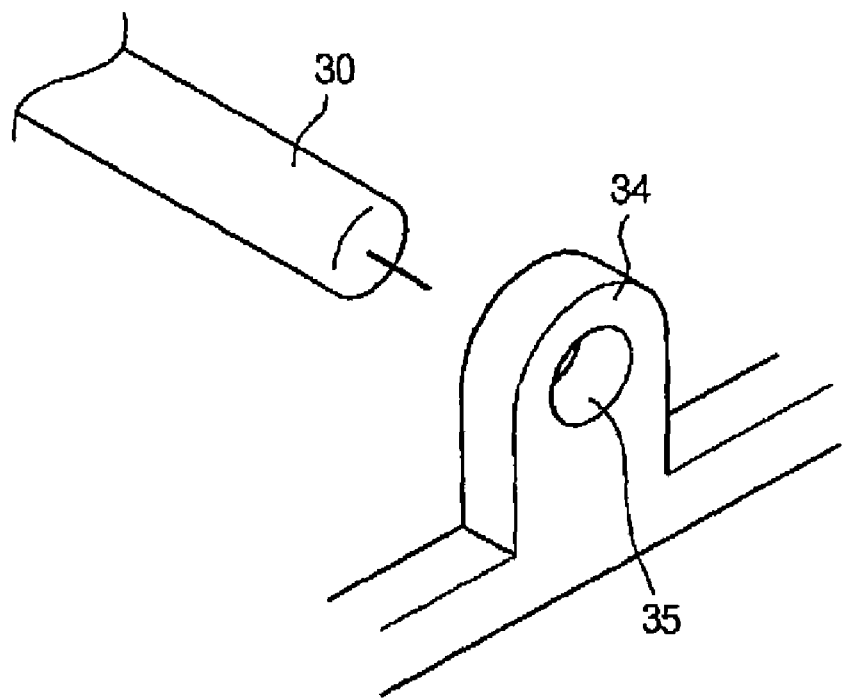

BACKLIGHT UNIT OF LIQUID CRYSTAL DISPLAY

This application claims the benefit of priority under 35 U.S.C. §119 to Korean application 50546/2004, filed Jun. 30, 2004.

BACKGROUND OF THE INVENTION

1. Field of the Invention

The present invention relates to a liquid crystal display (LCD), and more particularly, to a direct type backlight unit of an LCD.

2. Description of the Related Art

A cathode ray tube (CRT) is an electrical device for displaying images. CRTs are found in computer monitors, televisions, oscilloscopes, etc. However, CRTs are heavy and bulky and there is a growing demand for slim, light-weight electrical devices.

Other types of display devices have been developed to replace the heavy and bulky CRTs, including LCDs utilizing optical property effects, plasma display panels (PDPs) utilizing plasma discharge effects, and electro luminescence displays (ELDs) utilizing electroluminescence effects.

Recently, thin, light-weight, low power consuming LCDs have been developed. There is a growing demand for LCDs, which are presently developed enough to function as flat display devices in various devices, including laptop computer monitors, desktop computer monitors, and large electronic display boards.

To display an image, LCDs typically transmit light from an external source. Accordingly, most LCDs utilize a backlight unit as an external light source emitting light toward the LCD panel.

Generally, a backlight unit includes one or more tubular light-emitting lamps arranged behind an LCD panel. Depending on the arrangement of the lamps, the backlight units are classified as edge type or direct type units.

In an edge type unit, a lamp unit is installed at a side of a light guide plate. The lamp unit includes a light-emitting lamp, a lamp holder to hold and protect each end of the lamp, and a lamp reflector with one side inserted in a side edge of the light guide plate. The lamp reflector partially encloses the lamp to reflect light from the lamp toward the light guide plate. Edge type backlight units are typically used in smaller LCDs, including laptop computer LCD monitors and desktop computer LCD monitors.

Direct type backlight units have been developed for larger LCDs that are 20-inches or bigger in size. A direct type backlight unit includes a plurality of lamps uniformly arranged below a diffusion plate, emitting light directly to an LCD panel. Because direct type backlight units utilize light more efficiently than edge type backlight units, direct type units are particularly well suited for large sized LCDs requiring more brightness.

However, because direct type backlight units usually operate longer and utilize more lamps than edge type backlight units, direct type backlight units in large LCD monitors and LCD TVs are more prone to fail than edge type backlight units. Moreover, edge type backlight units with lamp units at both sides of a light guide plate are less affected when a lamp unit malfunctions.

Direct type backlight units are more prone to problems because they include a plurality of lamps under a LCD panel. For example, if one of the lamps is not turned on, there is a noticeable difference in brightness on the part of the LCD screen where the malfunctioning lamp is located. Since LCDs with direct type backlight unit require frequent lamp replacements, it is desirable for them to have a structure well-suited for lamp replacements. Regardless, having to replace lamps in either case decreases luminescence efficiency.

Backlight units of the related art will now be described with reference to the accompanying drawings.

FIG. 1 is an exploded perspective view of an edge type backlight unit according to the related art; FIG. 2 is an exploded perspective view of a direct type backlight unit according to the related art.

As stated before, edge type backlight units may be used in desktop or laptop computer monitors. FIG. 1 describes an edge type backlight unit in a desktop monitor. Here the backlight unit includes lamps 10 for a source of light, a light guide plate 11, a diffusion sheet 12, a prism sheet 13, an LCD panel 14 above the prism sheet 13, a fixture (not shown) under the light guide plate 11, and a lower reflection plate 16. The light guide plate 11 guides light from the lamps 10 toward the LCD panel 14, and the diffusion sheet 12 diffuses light from the light guide plate 11 in an upward direction at a predetermined angle. One or more additional diffusion sheets may be included. The prism sheet 13 refracts and condenses the diffused light, sending the light to the LCD panel 14. The lower reflection plate 16 reflects light emitted to the fixture toward the LCD panel 14 to minimize light loss.

An edge type backlight unit further includes lamp reflectors 18 and lamp holders 17. Each of the lamp reflectors 18 encloses a portion of the lamp 10 at a position opposite to the light guide plate 11, such that light emitted in a direction opposite to the light guide plate 11 can be reflected toward the light guide plate 11 to limit loss of light. The lamp holders 17 support the light guide plate 11 and fix their corresponding lamps 10 at a predetermined position.

While the backlight unit for the desktop computer in the present example includes lamps 10 at both sides of the light guide plate 11, backlight units for laptop computers may include a single lamp at one side of the light guide plate.

The direct type backlight unit depicted in FIG. 2 includes a plurality of light-emitting lamps 1, an outer case 3 to fix and support the light-emitting lamps 1, and light scattering units 5a, 5b, and 5c disposed between the light-emitting lambs and an LCD panel (not shown).

The light scattering units 5a, 5b, and 5c prevent contours of the light-emitting lamps 1 from appearing on the LCD panel screen. That is, the light scattering units 5a, 5b, and 5c receive and scatter non-uniform light from the light emitting lamps 1, uniformly projecting the light toward the LCD panel so that the LCD panel can display images with a uniform brightness. To increase the light scattering effect, the light scattering units 5a, 5b, and 5c include a plurality of diffusion sheets and a plurality of diffusion plates.

The direct type backlight unit in FIG. 2 further includes a reflection plate 7 at the inner bottom of an outer case 3 to reflect light from the light-emitting lamps 1 toward the LCD panel and to decrease light loss.

Each of the light-emitting lamps 1 is a cold cathode fluorescent lamp (CCFL). The light-emitting lamp 1 includes a tube and electrodes at both ends. When power is applied to the electrodes, the light-emitting lamp 1 emits light. Each end of the light-emitting lamp 1 is inserted in holes located on opposite sides of the outer case 3.

For each light-emitting lamp 1, lead wires 9 and 9a are connected to electrodes. Each lead wire 9 and 9a is joined to another lead wire by a separate connector (not shown), providing a connection to drive a circuit below the outer case 3.

External electrode fluorescent lamps (EEFL) or hot cathode fluorescent lamps (HCFL) may substitute for the light-emitting CCFL lamps 1 in FIG. 2.

FIGS. 3A to 3C depict representative lamp support structures used in direct type backlight units according to the related art.

In FIG. 3A, a recessed portion 32 is provided to receive an end of a tube type lamp 30. In FIGS. 3B and 3C, the lamp support structures 34 provide an appropriate hole 35 for a particular tube type lamp 30 end.

Because the lamps in FIGS. 3A to 3C have a tubular shape, the radial, light emitting surface of the lamp may be arbitrarily oriented when the lamp is fixed to the lamp support.

This would not be a problem if the light were uniformly emitted from the radial surface of the lamp. However, if light intensity differs depending on the radial direction of the lamp surface, installation of arbitrarily oriented lamps may provide suboptimal performance, including non-uniform brightness and deteriorating image quality. This may be the case when using thin backlight units in which the radial surface of the lamp is treated to produce radially varying light intensities to prevent contours of the lamp from appearing on the LCD panel screen.

In the related art, it is not easy to install a surface treated lamp oriented in a proper direction. To do so, would require a loss in productivity. Moreover, even if the lamp were installed in a proper orientation, the vibration and impact associated with long-term use may alter the orientation.

SUMMARY OF THE INVENTION

Accordingly, the present invention is directed to a backlight unit substantially obviating one or more problems due to limitations and disadvantages of the related art.

The present invention provides a backlight unit having lamp support structures uniquely fitted for asymmetric lamp holder ends to facilitate installation of the lamp in a particular orientation. In addition, because the lamp surface of the present invention is treated to emit light at different intensities, light can be uniformly projected from the disclosed backlight unit to a panel, such as LCD panel, in which the backlight unit is used.

In one aspect, the present invention provides a backlight unit including: a plurality of tube type light-emitting lamps, each lamp fitted to at least one asymmetric lamp holder; a plurality of lamp supports fixedly engaging a plurality asymmetric lamp holders fitted to the tube type light-emitting lamps; and an outer case including the plurality of supports to fix and support each lamp.

In another aspect, the present invention provides a backlight unit including: a plurality of tube type light-emitting lamps, each tube type light-emitting lamp fitted to at least one asymmetric lamp holder, where at least one tube type light-emitting lamp has a treated surface emitting light with different intensities; a plurality of lamp supports fixedly engaging a plurality asymmetric lamp holders fitted to the tube type light-emitting lamps; and an outer case including the plurality of supports to fix and support each lamp.

In a further aspect, the present invention provides an LCD device, including an LCD panel and a backlight unit, where the backlight unit includes: a plurality of tube type light-emitting lamps, each lamp fitted to at least one asymmetric lamp holder; a plurality of lamp supports fixedly engaging a plurality asymmetric lamp holders fitted to the tube type light-emitting lamps; and an outer case including the plurality of supports to fix and support each lamp.

It is to be understood that both the foregoing general description and the following detailed description exemplify the present invention and are intended to illustrate the present invention as set forth in the specification, claims, and appended drawings. exemplary and explanatory and are intended to provide further explanation of the invention as claimed.

Additional advantages and features of the present invention are set forth in the description and claims which follow and will be apparent to those having ordinary skill in the art examining the disclosures therein. The advantages of the present invention may be realized or achieved with the embodiments set forth in the specification, claims, and appended drawings.

BRIEF DESCRIPTION OF THE DRAWINGS

The accompanying drawings illustrate aspects and principles of the related art and of the present invention:

FIGS. 3A to 3C show lamp support structures of a direct type backlight unit according to the related art;

DETAILED DESCRIPTION OF THE INVENTION

Reference to various embodiments of the present invention will now be made, examples of which are described in the specification and claims and illustrated in FIGS. 4-7.

The present invention relates to a direct type backlight unit and to an LCD device including a backlight unit of the present invention. LCD devices in accordance with the present invention may employ any of the inventive backlight unit embodiments disclosed in the specification and claims.

When compared with a backlight unit of the related art, a backlight unit of the present invention characteristically includes a plurality of lamps, lamp holders, and lamp supports, in which the lamp holders and lamp supports share asymmetric structures for fixing lamps to lamp supports in a specific orientation or direction. In a further aspect, the backlight units of the present invention may further include lamps emitting light with different intensities depending on the orientation or direction in which the lamp is placed.

Figure 1:
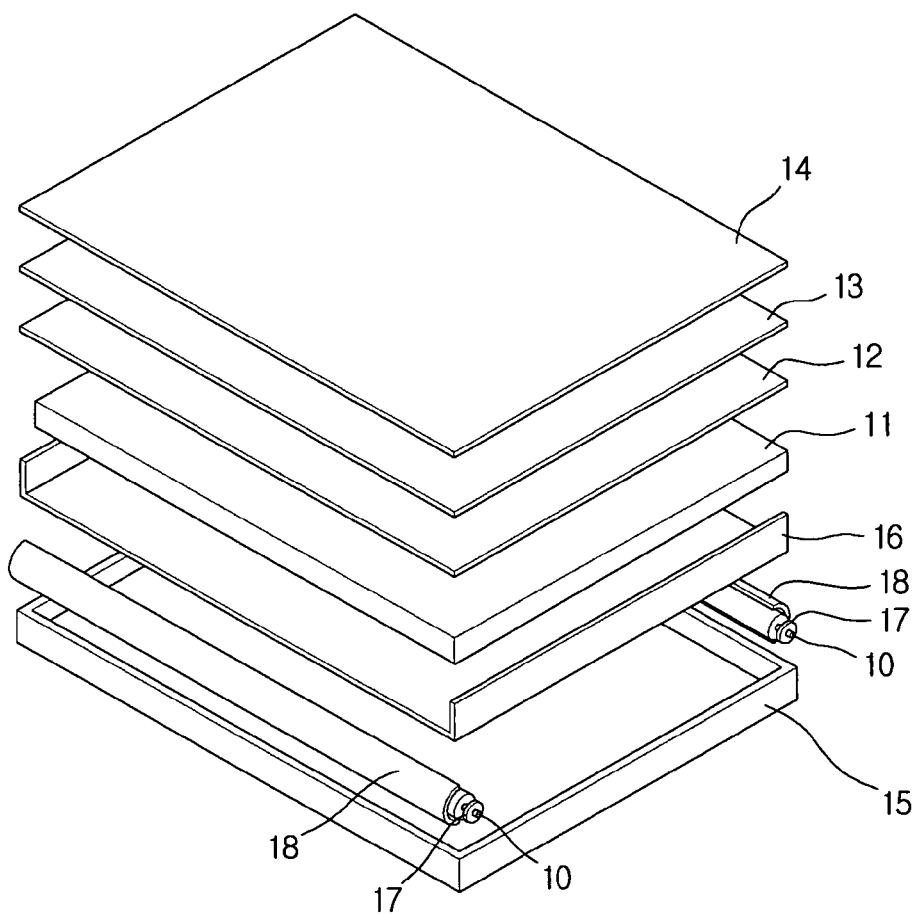
FIG. 1 is an exploded perspective view of an edge type backlight unit according to the related art.
Figure 2:
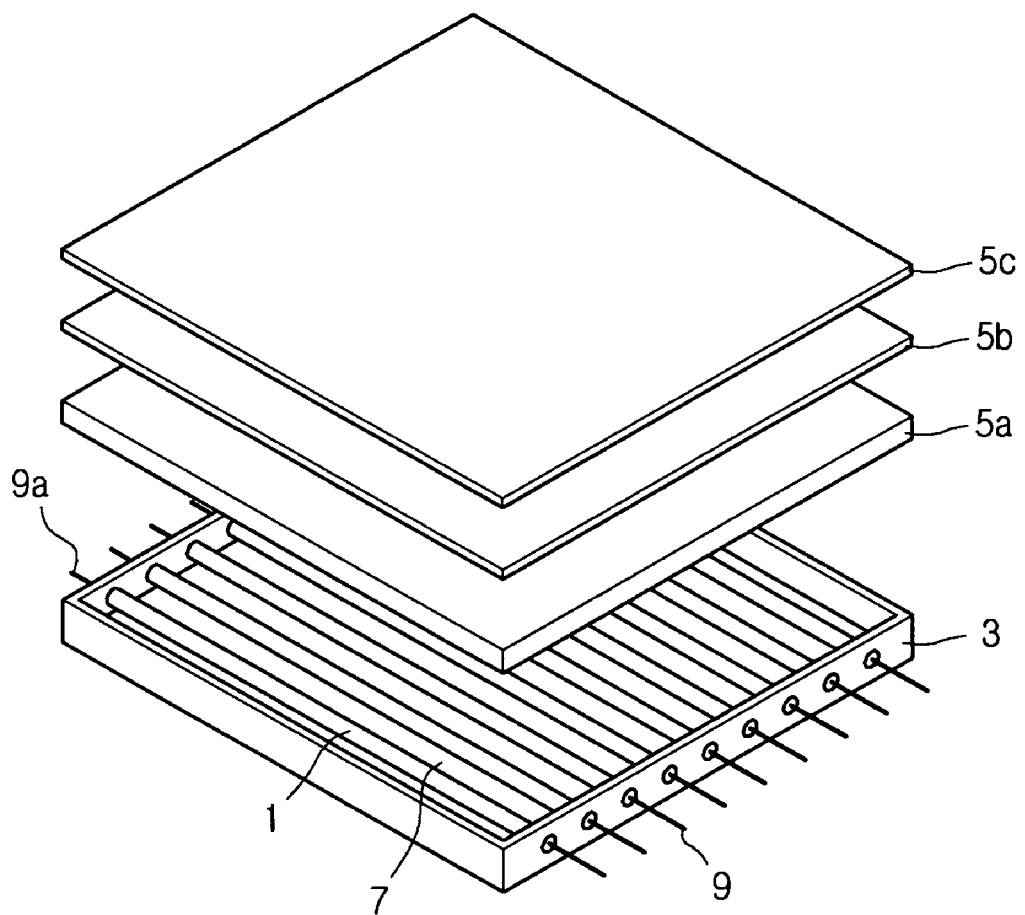
FIG. 2 is an exploded perspective view of a direct type backlight unit according to the related art.
Figure 3A:
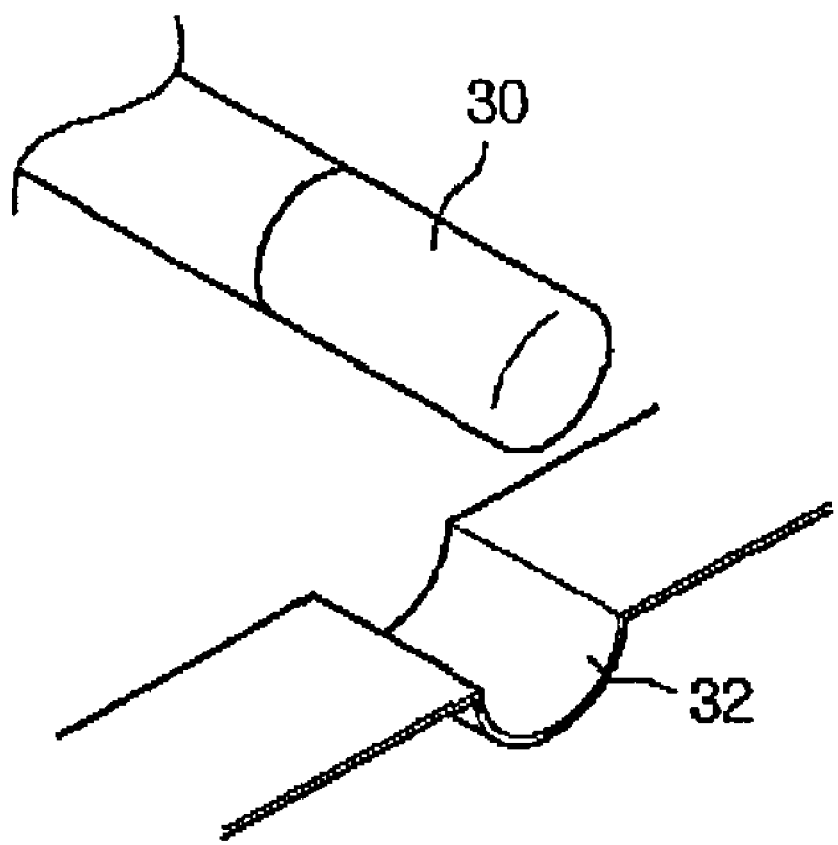
Figure 3C:
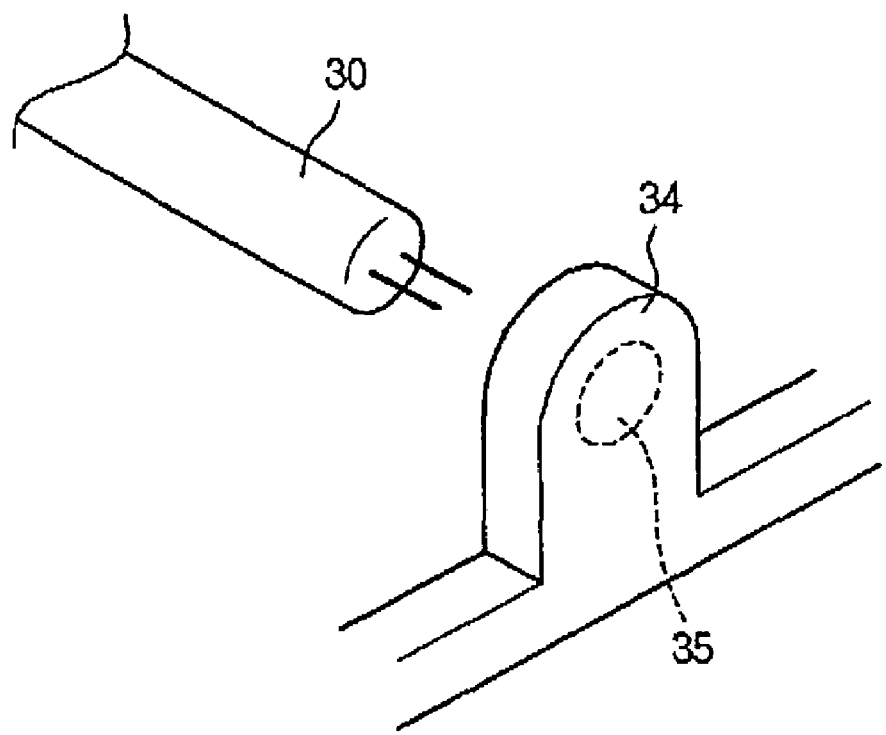
Figure 4A:
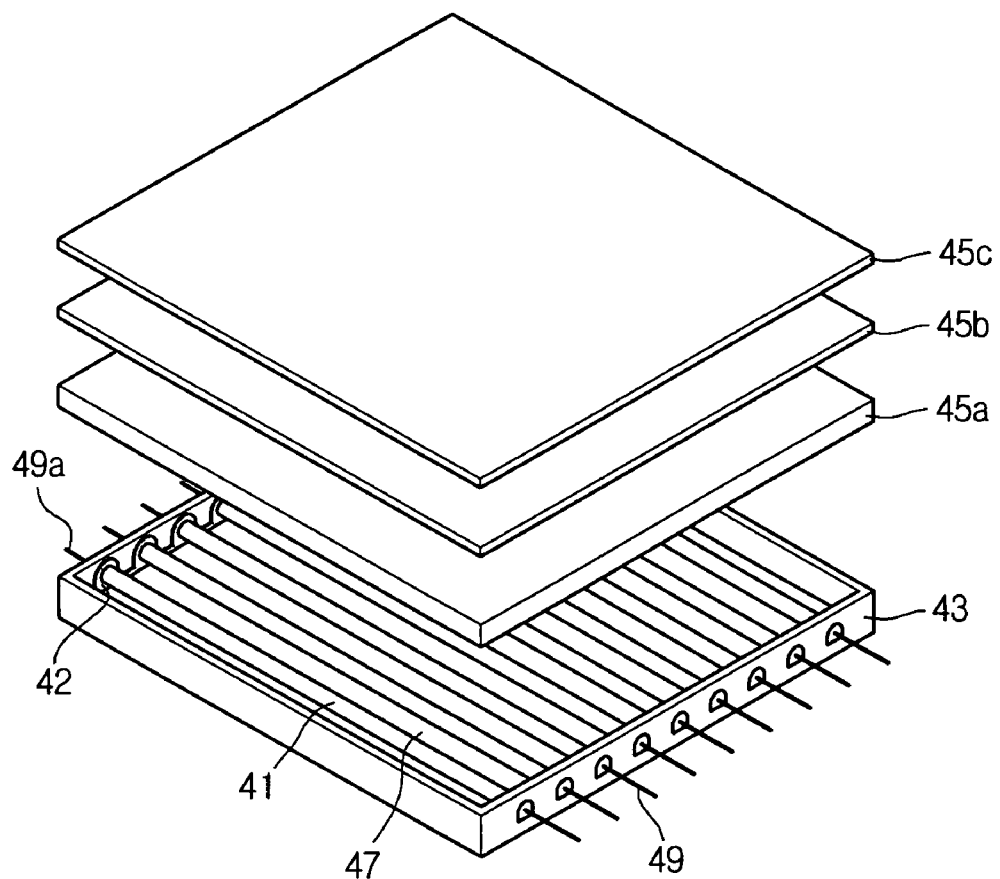
FIGS. 4A and 4B provide exploded perspective views of a backlight unit according to some aspects of the present invention.
Figure 4B:
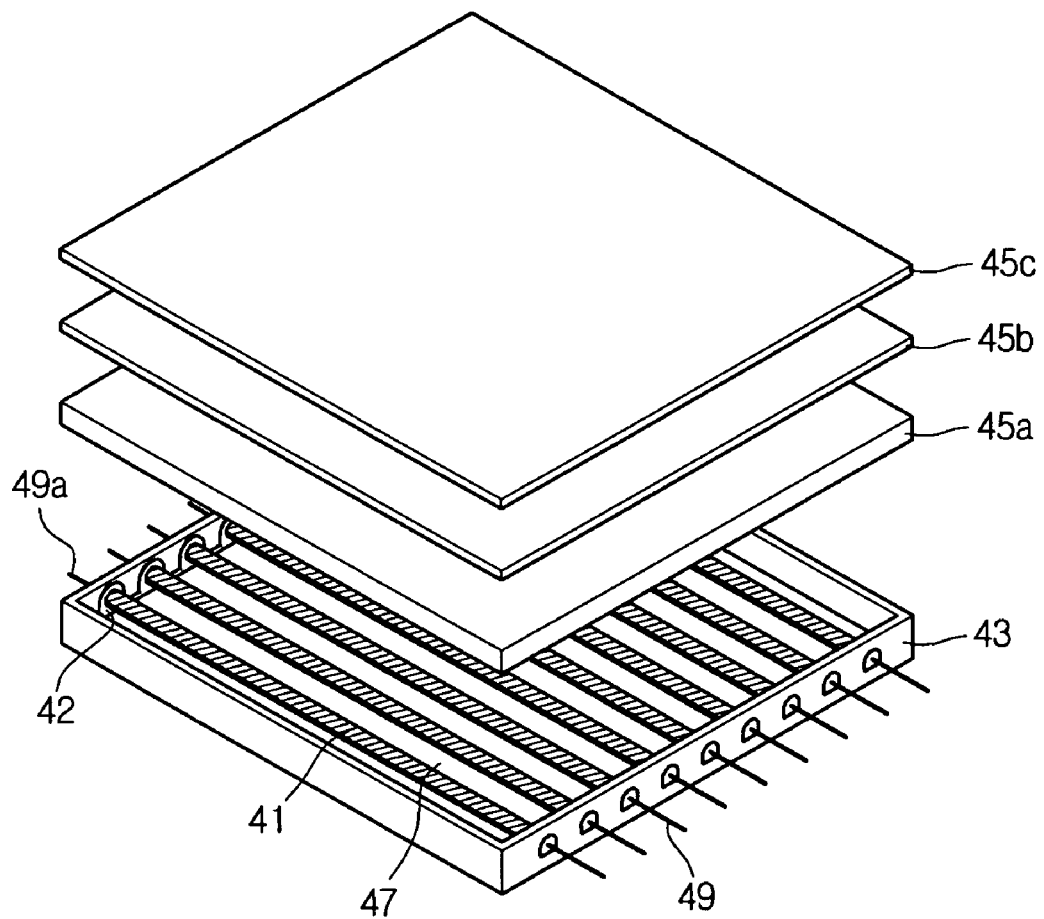

FIGS. 4A and 4B provide exploded perspective views illustrate a backlight unit according to aspects of the present invention. FIG. 4A depicts a direct type backlight unit including a plurality of light-emitting lamps 41, an outer case 43 to fix and support the lamps 41, and light scattering units 45a, 45b, and 45c disposed between the lamps 41 and an LCD panel (not shown).

Light scattering units 45a, 45b, and 45c are provided to prevent the contours of the lamps 41 from appearing on the LCD panel screen. Accordingly, the light scattering units 45a, 45b, and 45c receive non-uniform light from the lamps 41, scatter the received light, and then uniformly or substantially uniformly project the light toward the LCD panel so that the LCD panel can display images having uniform brightness. To increase the light scattering effect, the light scattering units 45a, 45b, and 45c may further include a plurality of diffusion sheets and/or diffusion plates.

The direct type backlight unit may further include a reflection plate 47 at an inner bottom of the outer case 43 to reflect light from the lamps 41 toward the LCD panel and reduce the loss of light.

The lamps 41 may include cold cathode fluorescent lamps (CCFL), external electrode fluorescent lamps (EEFL), and/or hot cathode fluorescent lamps (HCFL). The lamps 41 include a tube with electrodes at each end. When power is applied to the electrodes, a lamp 41 will emit light. A lamp 41 may further include or be connected to an asymmetric lamp holder (not shown) at each end for coupling with a lamp support 42 in the outer case 43.

For each light-emitting lamp 41, lead wires 49 and 49a are connected to electrodes. The lead wires 49 and 49a are extended from each end and joined to another lead wire by a separate connector (not shown), providing a connection to drive a circuit below the outer case 43.

Because the lamps 41 are connected to an asymmetric lamp holder (not shown) at each end, the lamp 41 can be installed in a particular, appropriate orientation by coupling or fitting the lamp holder to a matching lamp support 42 in the outer case 43. In this way, a fixed orientation of the installed lamp 41 may be maintained even when subjected to vibrations, impact or long term use and may therefore allow light to be uniformly emitted for a substantially long period of time.

In a further aspect, hatched lamp portions in FIG. 4B are depicted to represent lamps 41 that are surface treated to emit light with different intensities. To achieve different light emitting intensities, a light diffusion pattern may be coated or printed on an upper surface of the lamp 41. Alternatively, an optical sheet having light transmittance under 100% may be attached to the upper surface of the lamp 41. By using lamps with different light emitting intensities, light may be more uniformly projected to an LCD panel, resulting in better image quality.

Figure 5A:
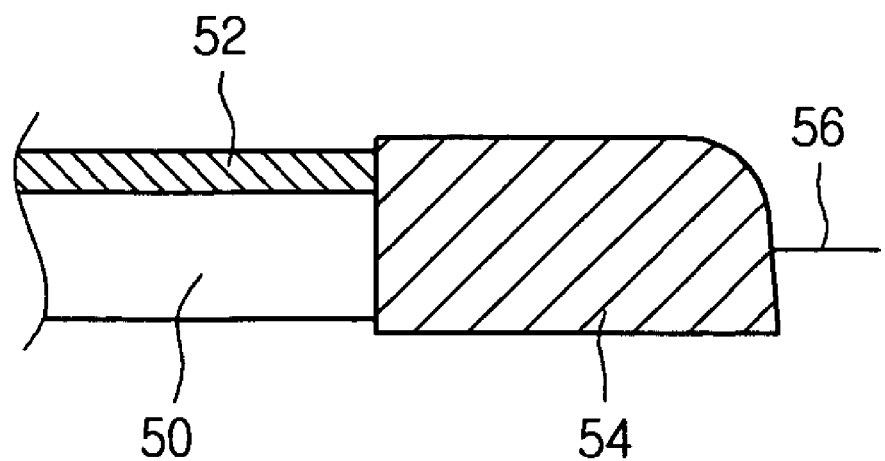
FIGS. 5A and 5B provide a side sectional view and a cross sectional view showing an end of a lamp of a backlight unit according to an aspect of the present invention.
Figure 5B:
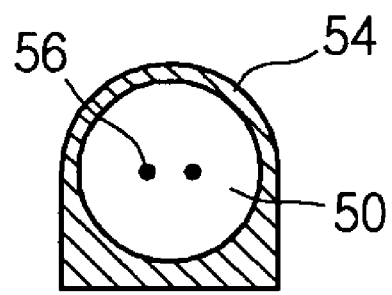

FIGS. 5A and 5B depict a side sectional and cross sectional views of a lamp/lamp holder end that may be used in a backlight unit according to certain aspects of the present invention. In the representative example depicted, a surface of a lamp 50 may be treated to emit light with different intensities. The surface treatment of the lamp 50 in FIG. 5A is similar to the treatment indicated by the hatched lamp portions in FIG. 4B.

For example, a light diffusion pattern 52 may printed or coated on a top surface of the lamp 50 to emit light with different intensity. Alternatively, an optical sheet having a light transmittance of less than 100% can be attached to the surface of the lamp 50 instead. In principle, any conventional treatment sufficient to uniformly or substantially uniformly project light from lamps fixedly oriented to e.g., an LCD panel may be used.

Lamps 50 may include any tube type light-emitting lamp, including but not limited to CCFL, EEFL, and HCFL lamps. The lamp 50 may further include or be connected to at least one or two asymmetric lamp holders 54 at one or both ends.

Figure 6:
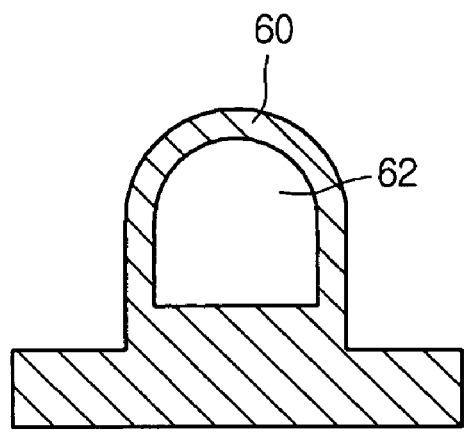
FIG. 6 is a sectional view of a lamp support from a backlight unit according to another aspect of the present invention.
Figure 7:
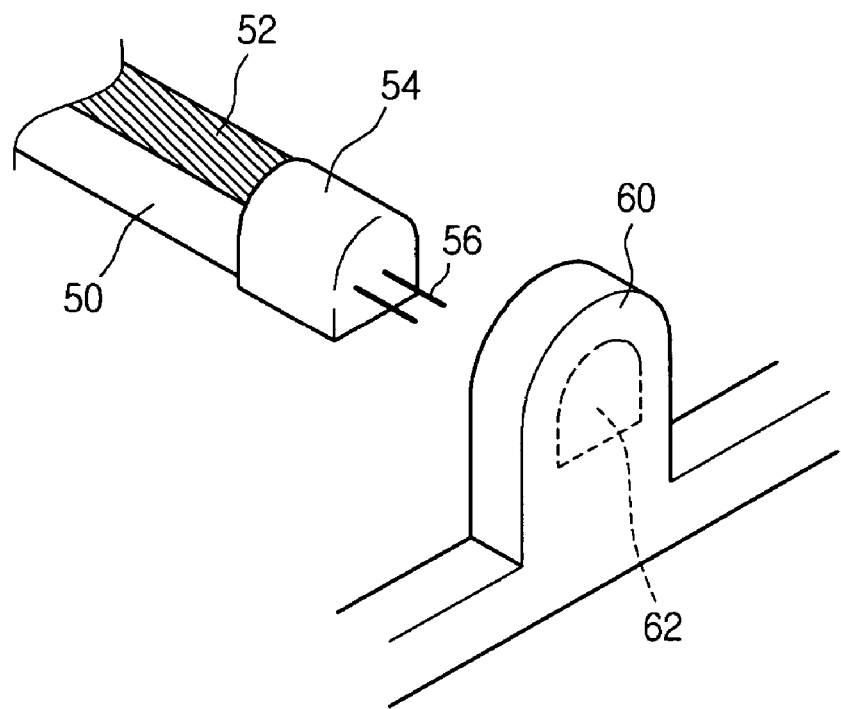
FIG. 7 is a perspective view showing the coupling structure between a lamp and a lamp support from a backlight unit according to further aspects of the present invention.

When assembled, the lamp 50 and/or its lamp holder is coupled to a lamp support (refer to 60 in FIG. 6) disposed on a portion or edge of the outer case. FIG. 6 is a sectional view of a lamp support 60 for a representative backlight unit according to the present invention; FIG. 7 is a perspective view illustrating the coupling of a lamp 50, lamp holder 54 and lamp support 60 with a representative backlight unit according to the present invention.

In FIGS. 6 and 7, the lamp support 60 is illustrated to define an asymmetric hole 62 for coupling to the lamp holder 54 in or connected to the lamp 50. The lamp 50, in conjunction with the lamp holder 54, lead wires 56, and lamp support 60 together serve to fix the orientation of the lamp to the holder 56. Because the hole 62 in the lamp support 60 has an asymmetric shape complementary to the asymmetric shape of the lamp holder 54, the lamp holder 50 can only be inserted into the complementary hole 62 in the lamp support 60 in a predetermined orientation.

By way of example, the asymmetric hole 62 in the lamp holder 60 has a rectangular portion and a semicircular portion; accordingly, as shown in FIG. 6, the lamp holder 54 has the complementary shape matching suitable for orientations-specific engagement by asymmetric hole 62. Accordingly, the lamp 50 can be inserted and maintained in a specific orientation in the lamp holder 60 even when vibration or impact is applied. Thus, the lamp 50 can be easily installed in a desired orientation or direction and can be firmly maintained in a predetermined position for extended periods of time owing to the asymmetric nature of the lamp holder 54 and its complementary lamp support 60 providing an asymmetric hole 62.

To fix a lamp in a particular orientation, the lamp holders and lamp supports may be designed to accommodate a wide variety of complementary three dimensional shapes suitable for maintaining a fixedly orienting the lamps.

In view of the advantages and benefits of the present invention, an LCD device employing a backlight unit according to the present invention may display images exhibiting an increased uniformity in brightness, even when the thickness of the LCD if reduced.

It will be apparent to those skilled in the art that various modifications and variations can be made in the present invention. Thus, the present invention is intended to cover the modifications and variations of this invention provided they come within the scope of the specification, appended claims and their equivalents.

What is claimed is:

1. A liquid crystal display (LCD) device comprising:
an LCD panel; and
a backlight, wherein the backlight unit comprises:
 a plurality of tube-type light-emitting lamps;
 a plurality of lamp holders, the lamp holders configured to receive a respective tube-type light-emitting lamp, and an outer surface of each lamp holder having an asymmetric and non-circular shape;
 a plurality of lamp supports; and
 an outer case;
 wherein the plurality of lamps supports are attached to an interior surface of the outer case and fixedly engage with the plurality of lamp holders,
 each lamp support comprising a closed loop hole, the closed loop hole having a mating shape with the asymmetric and non-circular shape of the outer surface of the lamp holders such that an outer surface of the lamp holder is surrounded by an interior surface of the closed loop hole, and the length of the lamp holder in the longitudinal direction of the lamp is substantially identical to the width of the closed loop hole;
 wherein each lamp has a top treated surface for diffusing light which includes one of a light diffusion pattern and an optical sheet;

wherein the lamp is engaged with the lamp holder, which is in turn inserted into the closed loop hole of the lamp support in the longitudinal direction that the lamp extends, and the lamp is secured in a specific orientation such that the top treated surface of each lamp faces a direction opposite to the outer case; and wherein the closed loop hole of the lamp support is open and upon insertion of the lamp holder into the closed loop hole of the lamp support, a wiring of the lamp passes through the closed loop hole and extends out of the lamp support.

2. The LCD device of claim 1, wherein the top treated surface emits light with different intensities.

3. The LCD device of claim 1, further comprising:
at least one light scattering unit disposed between at least one lamp and the LCD panel.

4. The LCD device of claim 1, wherein at least one tube type light emitting lamp is a cold cathode fluorescent lamp (CCFL), an external electrode fluorescent lamp (EEFL), or a hot cathode fluorescent lamp (HCFL).

5. The LCD device of claim 1, wherein the light diffusion pattern is printed or coated on the top treated surface of the at least one tube type light-emitting lamp.

6. The LCD device of claim 1, wherein the optical sheet has a light transmittance lower than 100%.

* * * * *